(12) United States Patent
Jiang et al.

(10) Patent No.: US 10,615,598 B2
(45) Date of Patent: Apr. 7, 2020

(54) AC SWITCH WITH DC VOLTAGE GENERATION

(71) Applicant: Monolithic Power Systems, Inc., San Jose, CA (US)

(72) Inventors: Jian Jiang, San Jose, CA (US); Pengjie Lai, San Jose, CA (US); Bo Zhou, San Jose, CA (US); Junyong Gong, Chengdu (CN); Eric Yang, Saratoga, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 531 days.

(21) Appl. No.: 15/475,002

(22) Filed: Mar. 30, 2017

(65) Prior Publication Data
US 2018/0287381 A1 Oct. 4, 2018

(51) Int. Cl.
*H02J 3/00* (2006.01)
*H02J 7/00* (2006.01)

(52) U.S. Cl.
CPC . *H02J 3/00* (2013.01); *H02J 7/00* (2013.01)

(58) Field of Classification Search
CPC ........................................................ H02J 3/00
See application file for complete search history.

(56) References Cited

U.S. PATENT DOCUMENTS

| 8,446,050 | B2   | 5/2013 | Robert  |           |
|-----------|------|--------|---------|-----------|
| 8,643,351 | B2   | 2/2014 | Pengjie |           |
| 8,693,276 | B2   | 4/2014 | Pengjie |           |
| 9,912,240 | B1 * | 3/2018 | Nguyen  | H02M 1/36 |

OTHER PUBLICATIONS

U.S. Appl. No. 14/859,102, filed Sep. 18, 2015, Jian Jiang.

* cited by examiner

*Primary Examiner* — Daniel J Cavallari
(74) *Attorney, Agent, or Firm* — Perkins Coie LLP

(57) ABSTRACT

An electrical circuit has a first integrated AC switch circuit connecting a first load to an AC voltage when the first integrated AC switch circuit is ON and a second integrated AC switch circuit connecting a second load to the AC voltage when the second integrated AC switch circuit is ON. The first integrated AC switch circuit generates a first DC voltage across a first capacitor and provides a pulse signal. When a VCCE pin of the second integrated AC switch circuit is coupled to a reference ground, a second capacitor is charged by the second integrated AC switch circuit to provide a second DC voltage. And when the VCCE pin of the second integrated AC switch circuit is floating or pulls high, the second capacitor is charged by the pulse signal.

7 Claims, 12 Drawing Sheets

AC SWITCH WITH DC VOLTAGE GENERATION

TECHNICAL FIELD

The present invention relates to electrical circuit, more particularly but not exclusively relates to AC switch circuit.

BACKGROUND

Traditionally, alternating current (AC) voltage supply is controlled through mechanical relay in home automation systems, such as applications for sprinkler valve, heating ventilating and air conditioning (HVAC), thermostat, or security camera. However, with improvement of smart home automation technology, mechanical relay is bulky and has a short and not constant operating life.

SUMMARY

In one embodiment, an electrical circuit has a first integrated AC switch circuit connecting a first load to an AC voltage when the first integrated AC switch circuit is ON and a second integrated AC switch circuit connecting a second load to the AC voltage when the second integrated AC switch circuit is ON. The first integrated AC switch circuit has a first power generation circuit configured to charge a first capacitor via rectifying the AC voltage in response to a first DC voltage across the first capacitor, and the first integrated AC switch circuit provides a pulse signal associated with the first DC voltage. The second integrated AC switch circuit has a second power generation circuit. A second capacitor is charged by the second power generation circuit via rectifying the AC voltage in response to a second DC voltage across the second capacitor when a VCCE pin of the second integrated circuit is coupled to a reference ground, and the second capacitor is charged by the pulse signal when the VCCE pin of the second integrated circuit is floating or pulls high.

These and other features of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Figure 1:
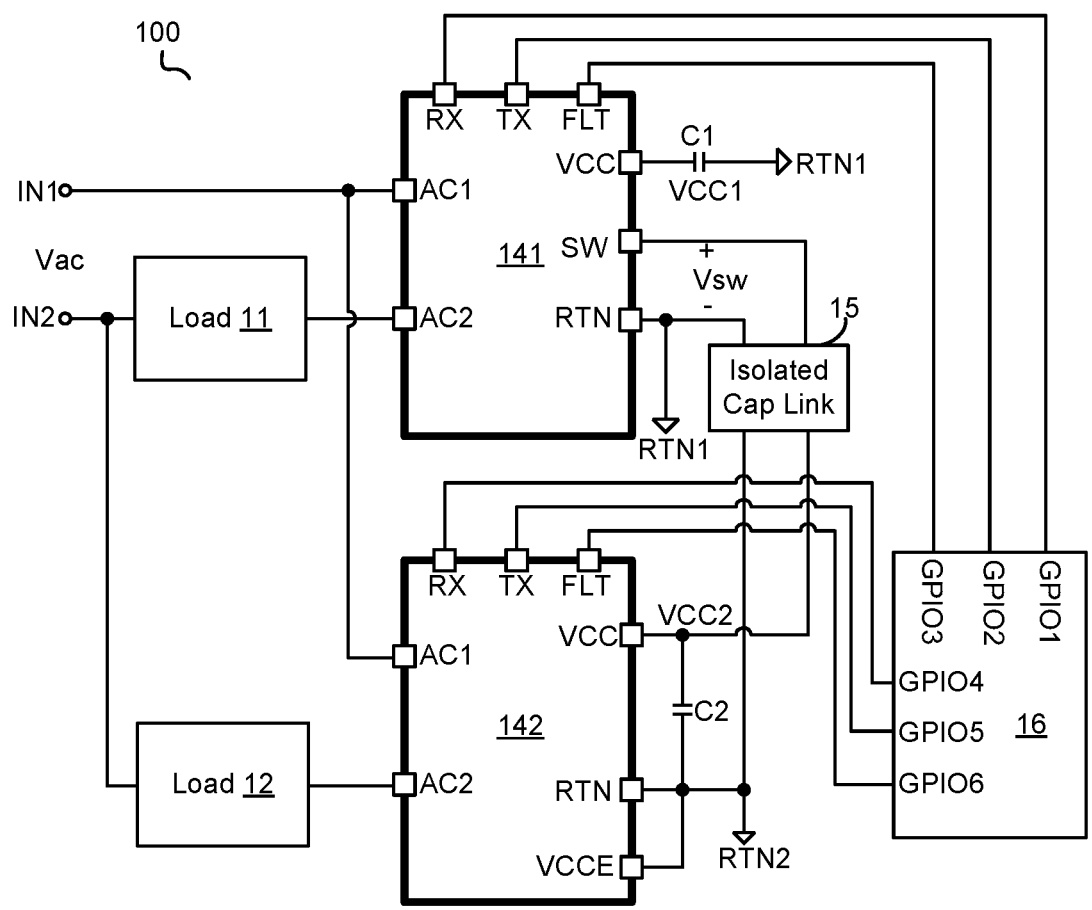
FIG. 1 schematically illustrates an electrical circuit 100 according to an embodiment of the present invention.

FIG. 1 schematically illustrates an electrical circuit 100 according to an embodiment of the present invention. In electrical circuit 100, an integrated AC (alternating current) switch circuit 141 is coupled between an AC voltage Vac and a load 11, and an integrated AC switch circuit 142 is coupled between AC voltage Vac and a load 12. Integrated AC switch circuit 141 connects load 11 to AC voltage Vac when Integrated AC switch circuit 141 is ON, and integrated AC switch circuit 142 connects load 12 to AC voltage Vac when Integrated AC switch circuit 142 is ON.

In one embodiment, integrated AC switch circuit 141 is integrated on one chip. In the example of FIG. 1, integrated AC switch circuit 141 has a plurality of pins comprising: an AC1 pin coupled to an input port IN1, and an AC2 pin coupled to an input port IN2 through load 11. An AC voltage Vac is applied between input port IN1 and input port IN2. In one embodiment as shown in FIG. 1, integrated AC switch circuit 141 further comprises: a VCC pin coupled to a capacitor C1 to provide a DC (direct current) voltage VCC1, a SW pin configured to provide a pulse signal Vsw associated with DC voltage VCC1, a switch M1 (refers to FIG. 3) coupled to block a first half-cycle (e.g., a positive half-cycle) of AC voltage Vac to load 11 when switch M1 is OFF, a switch M2 (refers to FIG. 3) coupled to block a second half-cycle (e.g., a negative half-cycle) of AC voltage Vac to load 11 when switch M2 is OFF. Switch M1 and switch M2 in integrated AC switch circuit 141 are coupled in series between AC1 pin and AC2 pin, wherein load 11 is connected to AC voltage Vac when switch M1 and switch M2 in integrated AC switch circuit 141 are turned ON. Integrated AC switch circuit 141 further comprises a RTN pin coupled to a reference ground RTN1. And integrated AC switch circuit 141 further comprises: a RX pin, a TX pin and a FTL pin, wherein RX pin, TX pin and FLT pin of integrated AC switch circuit 141 are coupled to general input/output pins GPIO1-GPIO3 of a MCU (Micro Control Unit) 16 respectively to communicate with MCU 16. RX pin of integrated AC switch circuit 141 is configured to receive a command sending by MCU 16, TX pin of integrated AC switch circuit 141 is configured to transit information back to MCU 16, and FLT pin of integrated AC switch circuit 141 is configured to indicate a fault condition. In one embodiment, MCU 16 may be replaced by other types of controller, such as a CPU (Central Process Unit). In one embodiment, Integrated AC switch circuit 141 is ON means that switch M1 and switch M2 in integrated AC switch circuit 141 are turned ON.

In one embodiment, integrated AC switch circuit 142 is integrated on one chip. In the example of FIG. 1, integrated AC switch circuit 142 has a plurality of pins comprising: AC1 pin coupled to input port IN1, and AC2 pin coupled to input port IN2 through load 12. In one embodiment as shown in FIG. 1, integrated AC switch circuit 142 further comprises: VCC pin coupled to a capacitor C2 to provide a DC voltage VCC2, RTN pin coupled to a reference ground RTN2, a VCCE pin selectively coupled to RTN pin of integrated AC switch circuit 142. Switch M1 and switch M2 (refers to FIG. 7) in integrated AC switch circuit 142 are coupled in series between the AC1 and AC2 pins, wherein load 12 is connected to AC voltage Vac when switch M1 and switch M2 in integrated AC switch circuit 142 are turned ON. In one embodiment, when VCCE pin is coupled to RTN pin of integrated AC switch circuit 142 as shown in FIG. 1, a DC voltage generation of integrated AC switch circuit 142 is disabled, pulse signal Vsw charges capacitor C2 through an isolated cap link 15. The "DC voltage generation" of integrated AC switch circuit 142 means that integrated AC switch circuit 142 charges capacitor C2 in a timely manner to provide DC voltage VCC2 across capacitor C2 via rectifying AC voltage Vac in response to DC voltage VCC2. In one embodiment, coupling VCCE pin to RTN pin means that VCCE pin pulls low. As shown in FIG. 1, SW pin and RTN pin of integrated AC switch circuit 141 are coupled to VCC pin and RTN pin of integrated AC switch circuit 142 respectively through isolated cap link 15. In another embodiment, when VCCE pin is floating or pulls high, the DC voltage generation of integrated AC switch circuit 142 is enabled, capacitor C2 is charged to provide DC voltage VCC2 by integrated AC switch circuit 142 during a time period that switch M1 and switch M2 in integrated AC switch circuit 142 are turned OFF. Integrated AC switch circuit 142 further comprises: RX pin, TX pin and FTL pin, wherein RX pin, TX pin and FLT pin of integrated AC switch circuit 142 are coupled to general input/output pins GPIO4-GPIO6 of MCU 16 respectively to communicate with MCU 16. RX pin of integrated AC switch circuit 142 is configured to receive the command sending by MCU 16, TX pin of integrated AC switch circuit 142 is configured to transit information back to MCU 16, and FLT pin of integrated AC switch circuit 142 is configured to indicate if any fault happens. In one embodiment, Integrated AC switch circuit 142 is ON means that switch M1 and switch M2 in integrated AC switch circuit 142 are turned ON.

Figure 2:
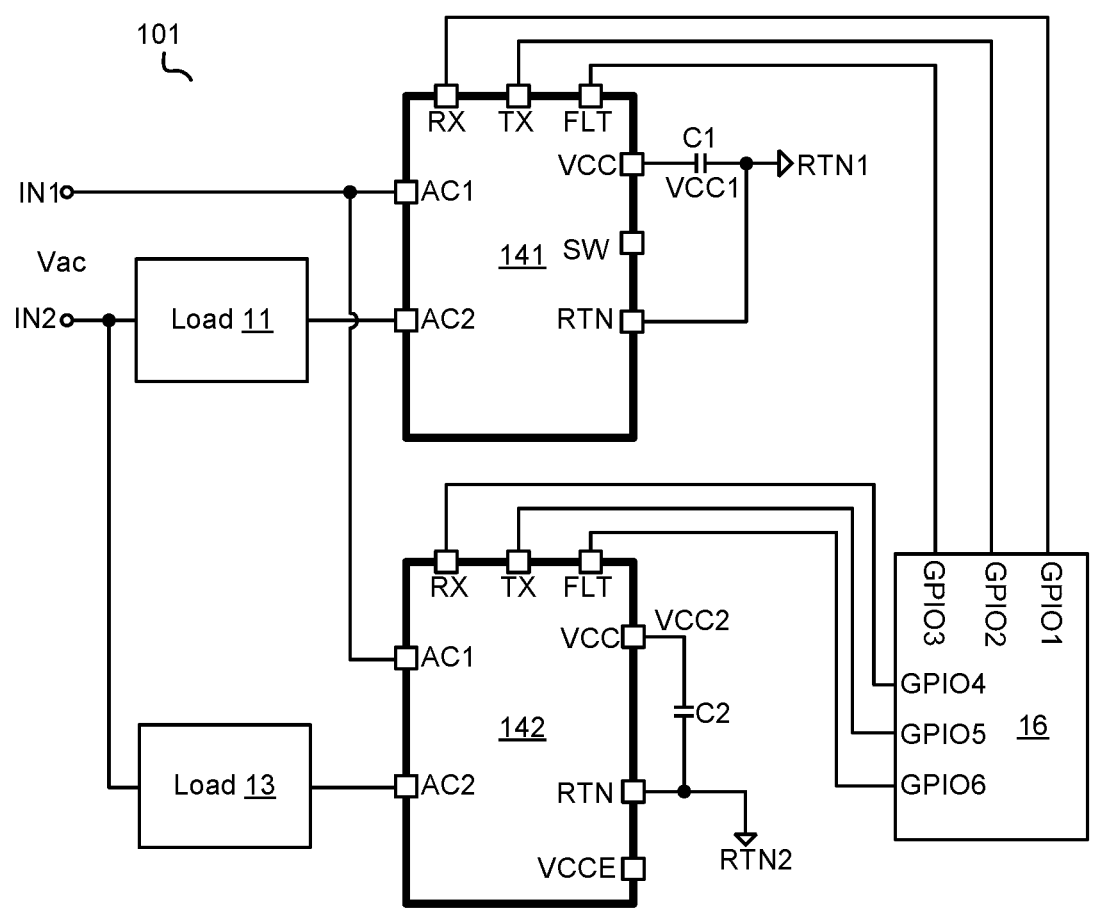
FIG. 2 schematically illustrates an electrical circuit 101 according to an embodiment of the present invention.

FIG. 2 schematically illustrates an electrical circuit 101 according to an embodiment of the present invention. In electrical circuit 101, integrated AC switch circuit 141 is coupled between AC voltage Vac and load 11, and integrated AC switch circuit 142 is coupled between AC voltage Vac and a load 13. In the embodiment shown in FIG. 2, VCCE pin of integrated AC switch circuit 142 is floating, the DC voltage generation of integrated AC switch circuit 142 is enabled, and integrated AC switch circuit 142 generates DC voltage VCC2 across capacitor C2.

In one embodiment, load 12 is high impendence load, and loads 11 and 13 are low impendence load. For a high impendence load application, when disabling the DC voltage generation, a leakage current of integrated AC switch circuit 142 is significantly reduced.

Figure 3:
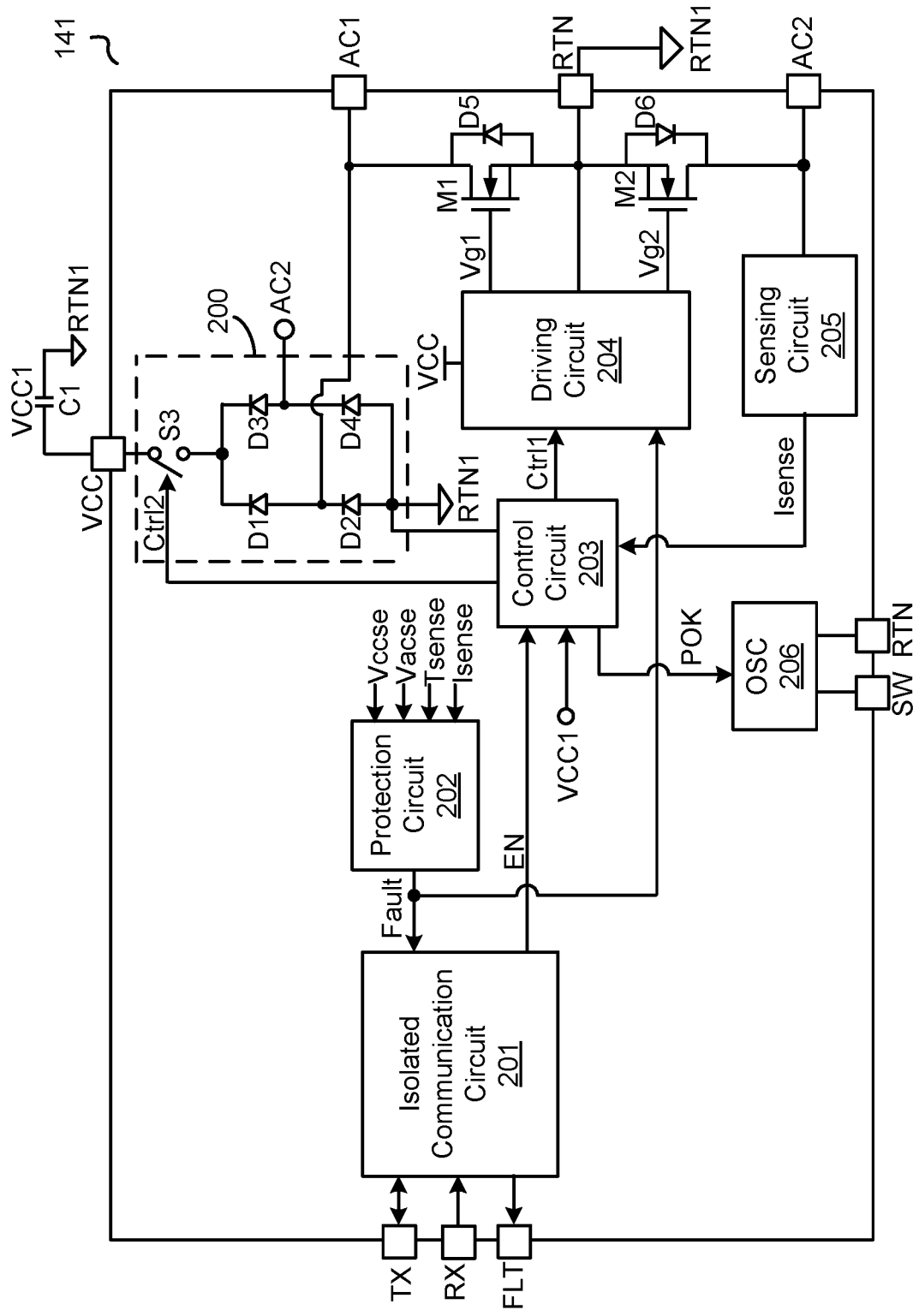
FIG. 3 schematically illustrates an integrated AC switch circuit 141 according to an embodiment of the present invention.

FIG. 3 schematically illustrates integrated AC switch circuit 141 according to an embodiment of the present invention. As one example, integrated AC switch circuit 141 comprises switch M1 and switch M2, a power generation circuit 200, an isolated communication circuit 201, a protection circuit 202, a control circuit 203, a driving circuit 204, a sensing circuit 205, and an oscillation circuit (OSC) 206.

Switches M1 and M2 are transistors, such as Metal Oxide Semiconductor Field Effect Transistor (MOSFET), Junction Field Effect Transistor (JFET), Bipolar Junction Transistor (BJT), and Insulated Gate Bipolar Transistor (IGBT). In the embodiment shown in FIG. 3, switches M1 and M2 are all MOSFETs as one example. As shown in FIG. 3, switch M1 has a drain coupled to AC1 pin, a source coupled to RTN pin, and a gate configured to receive a driving signal Vg1, switch M2 has a drain coupled to AC2 pin, a source coupled to RTN pin and the source of switch M1, and a gate configured to receive a driving signal Vg2. Switch M1 further comprises a parasitic diode D5 having an anode coupled to the source of switch M1 and a cathode coupled the drain of switch M1. Switch M2 further comprises a parasitic diode D6 having an anode coupled to the source of switch M2 and a cathode coupled to the drain of switch M2.

Power generation circuit 200 is configured to charge capacitor C1 via rectifying AC voltage Vac in response to DC voltage VCC1 across capacitor C1. Power generation circuit 200 has a first input terminal coupled to AC1 pin, a second input terminal coupled to AC2 pin, a first output terminal coupled to VCC pin, and a second output terminal coupled to RTN pin. In one embodiment, when switch M1 and switch M2 are turned OFF, power generation circuit 200 is turned ON to charge capacitor C1. As shown in FIG. 3, power generation circuit 200 comprises a rectifier circuit comprising diodes D1-D4, and a switch S3. A cathode of diode D1 is coupled to a cathode of diode D3 as a first output terminal of the rectifier circuit, an anode of diode D1 and a cathode of diode D2 are coupled to AC1 pin as a first input terminal of the rectifier circuit, an anode of diode D3 and a cathode of diode D4 are coupled to AC2 pin as a second input terminal of the rectifier circuit, and an anode of diode D2 and an anode of diode D4 are coupled to RTN pin as a second output terminal of the rectifier circuit. Switch S3 is coupled between the first output terminal of the rectifier circuit and VCC pin. When switch M1 and switch M2 are turned OFF, then switch S3 is turned ON, the rectifier circuit is configured to rectify AC voltage Vac to charge capacitor C1, and DC voltage VCC1 is provided across VCC pin and RTN pin.

Figure 5:
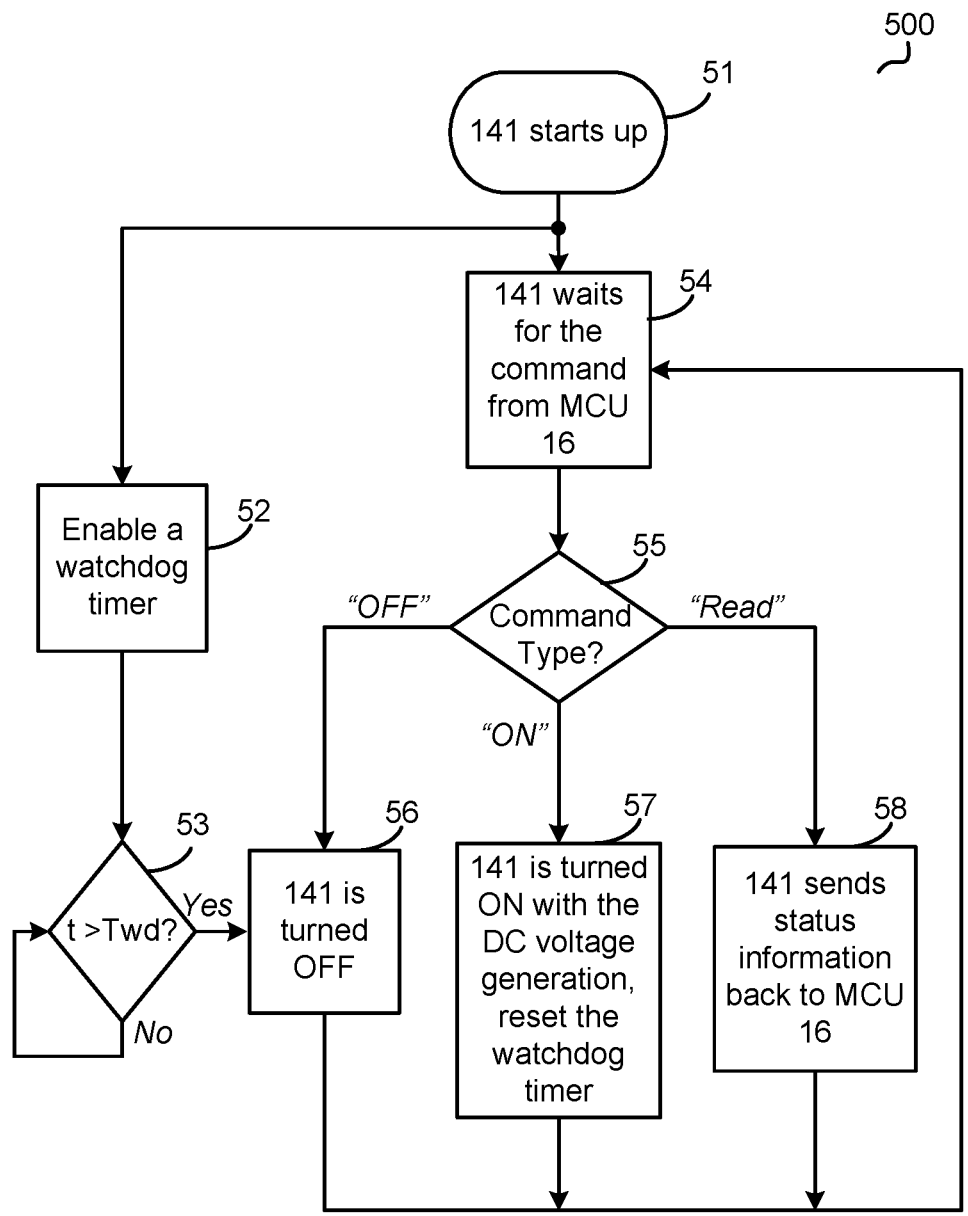
FIG. 5 shows a flowchart 500 for communication between integrated AC switch circuit 141 and a MCU 16 according to an embodiment of the present invention.

Isolated communication circuit 201 is employed to communicate with MCU 16. As shown in FIG. 3, Isolated communication circuit 201 is connected to MCU 16 through TX pin, RX pin and FLT pin. Isolated communication circuit 201 receives the command from MCU 16 through RX pin, provides status information back to MCU 16 through TX pin, and indicates fault though FLT pin. Isolated communication circuit 201 provides an enable signal EN to control integrated AC switch circuit 141 in response to the command received from MCU 16. In one embodiment, isolated communication circuit 201 is isolated with other circuits of integrated AC switch circuit 141, such as switch M1 and switch M2, power generation circuit 200, protection circuit 202, control circuit 203, driving circuit 204, sensing circuit 205, and oscillation circuit (OSC) 206. A flowchart for communication between integrated AC switch circuit 141 and MCU 16 is shown in FIG. 5.

Protection circuit 202 is configured to receive a voltage sense signal Vccse representative of DC voltage VCC1, a voltage sense signal Vacse representative of AC voltage Vac, a temperature sense signal Tsense representative of a temperature, and a current sense signal Isense representative of a current flowing through switch M1 and switch M2, and is configured to provide a fault signal Fault to isolated communication circuit 201 in response to voltage sense signal Vccse, voltage sense signal Vacse, temperature sense signal Tsense and current sense signal Isense. In one embodiment, if any fault happens, FLT pin turns high to inform MCU 16. The fault may comprise under voltage of DC voltage VCC1, over voltage of DC voltage VCC1, under voltage of AC voltage Vac, over voltage of AC voltage Vac, over temperature, and over current of the current flowing through switch M1 and switch M2.

Control circuit 203 is configured to provide a switching control signal Ctrl1 to control switch M1 and switch M2 based on enable signal EN, DC voltage VCC1, and current sense signal Isense. In one embodiment, when integrated AC switch circuit 141 receives an "ON" command from MCU 16, enable signal EN becomes high, integrated AC switch circuit 141 is enabled to turn ON switch M1 and switch M2 with the DC voltage generation. The "DC voltage generation" of integrated AC switch circuit 141 means that integrated AC switch circuit 141 charges capacitor C1 in the timely manner to provide DC voltage VCC1 across capacitor C1 via rectifying AC voltage Vac in response to DC voltage VCC1. When enable signal EN is high, switch M1 and switch M2 are turned ON to connect load 11 to AC voltage Vac if DC voltage VCC1 is larger than a high threshold Vthh, and switch M1 and switch M2 are turned OFF to charge capacitor C1 if DC voltage VCC1 is less than a low threshold Vthl. And when enable signal EN is low, switch M1 and switch M2 are turned OFF to disconnect load 11 to AC voltage Vac. In one embodiment, switch M1 and switch M2 are turned OFF at a zero-current point which means that the current flowing through switch M1 and switch M2 are zero or substantially zero. Control circuit 203 is configured to provide a switching control signal Ctrl2 to control switch M3 based on DC voltage VCC1. In one embodiment, when DC voltage VCC1 is less than low threshold Vthl, switch S3 is turned ON to connect capacitor C1 to AC voltage Vac through the rectifier circuit; and when DC voltage VCC1 is larger than high threshold Vthh, switch S3 is turned OFF to disconnect capacitor C1 from AC voltage Vac.

Figure 4:
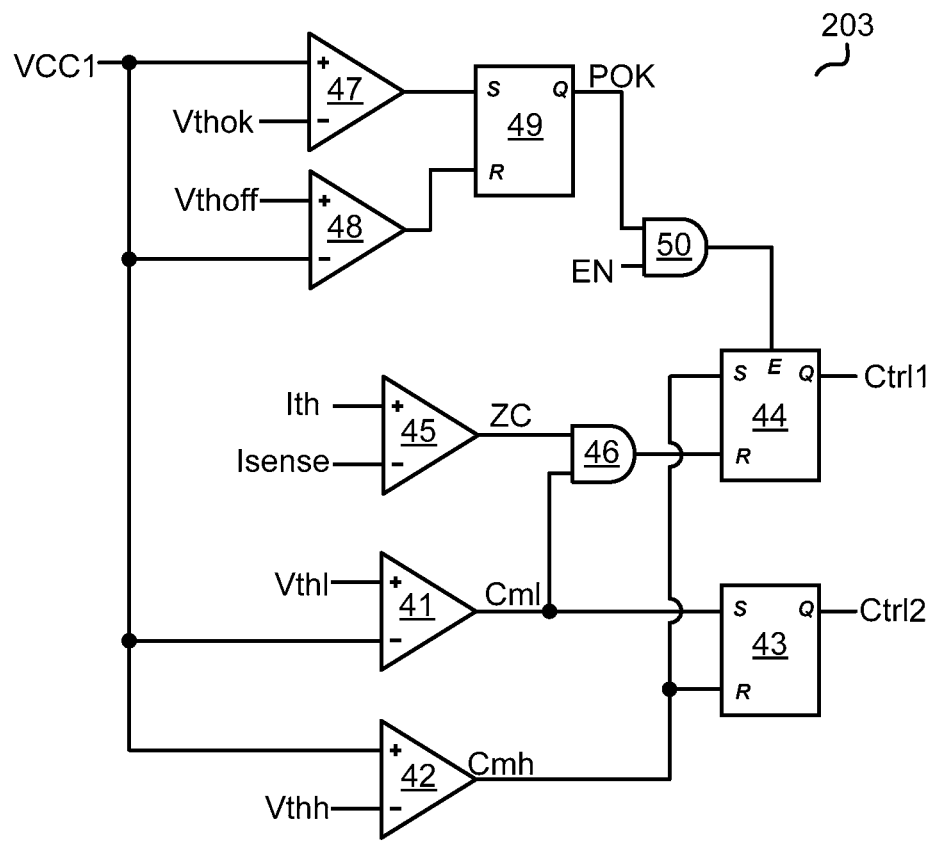
FIG. 4 schematically illustrates a control circuit 203 according to an embodiment of the present invention.

Control circuit 203 is configured to provide a power-OK indicating signal POK based on DC voltage VCC1. In one embodiment, once DC voltage VCC1 is larger than a power-OK threshold Vthok, power-OK indicating signal POK becomes high to indicate that DC voltage VCC1 is ready. FIG. 4 shows one embodiment of a detailed circuit structure of control circuit 203.

Driving circuit 204 is configured to provide driving signal Vg1 to gate of switch M1 and provide driving signal Vg2 to gate of switch M2 in response to switching control signal Ctrl1 and fault signal Fault. In one embodiment, when fault signal Fault indicates that there is no fault, driving circuit 204 is configured to provide driving signal Vg1 and driving signal Vg2 based on control signal Ctrl1, and when fault signal Fault indicates any fault happening, driving circuit 204 is configured to turn OFF switch M1 and switch M2.

Sensing circuit 205 is configured to provide current sense signal Isense in response to the current flowing through switch M1 and switch M2.

Oscillation circuit 206 is coupled to control circuit 203 to receive power-OK indicating signal POK, and is configured to provide a pulse signal Vsw across SW pin and RTN pin when power-OK indicating signal POK indicates that DC voltage VCC1 is ready. In one embodiment, pulse signal Vsw is a square waveform signal having a fixed frequency.

FIG. 4 schematically illustrates control circuit 203 according to an embodiment of the present invention. Control circuit 203 is configured to provide switching control signal Ctrl2 based on a comparing result between DC voltage VCC1 and low threshold Vthl and a comparing result between DC voltage VCC1 and high threshold Vthh. A comparator 41 has a non-inverting terminal configured to receive low threshold Vthl, an inverting terminal configured to receive DC voltage VCC1, and an output terminal configured to provide a comparing signal Cml in response to the comparing result between DC voltage VCC1 and low threshold Vthl. A comparator 42 has a non-inverting terminal configured to receive DC voltage VCC1, an inverting terminal configured to receive high threshold Vthh, and an output terminal configured to provide a comparing signal Cmh in response to the comparing result between DC voltage VCC1 and high threshold Vthh. A RS flip-flop 43 has a set terminal S coupled to the output terminal of comparator 41 to receive comparing signal Cml, a reset terminal R coupled to the output terminal of comparator 42 to receive comparing signal Cmh, and an output terminal Q configured to provide switching control signal Ctrl2.

Control circuit 203 has a RS flip-flop 44 to provide switching control signal Ctrl1. RS flip-flop 44 has a set terminal S coupled to the output terminal of comparator 42 to set RS flip-flop 44 in response to comparing signal Cmh, a reset terminal R coupled to the output terminal of comparator 41 to reset flip-flop 44 in response to comparing signal Cml, an enable terminal E, and an output terminal Q configured to provide switching control signal Ctrl1. In one embodiment, RS flip-flop 44 is further configured to be reset in response to current sense signal Isense. As shown in FIG. 4, a comparator 45 is employed to comparing current sense signal Isense with a current threshold Ith to indicate if the current flowing through switch M1 and switch M2 is zero or almost zero. Comparator 45 has an inverting terminal configured to receive current sense signal Isense, a non-inverting terminal configured to receive current threshold Ith, and an output terminal configured to provide a zero current indicating signal ZC via comparing current sense signal Isense with current threshold Ith. An AND gate 46 has a first input terminal configured to receive zero current indicating signal ZC, a second input terminal configured to receive comparing signal Cml, and an output terminal coupled to the reset terminal R of RS flip-flip 44. In one embodiment, current threshold Ith is zero, or around zero with a bias.

Control circuit 203 is configured to provide a power-OK indicating signal POK to indicate that DC voltage VCC1 is ready. A comparator 47 has a non-inverting terminal configured to receive DC voltage VCC1, an inverting terminal configured to receive power-OK threshold Vthok, and an output terminal. A comparator 48 has a non-inverting terminal configured to receive an off threshold Vthoff, an inverting terminal configured to receive DC voltage VCC1, and an output terminal. A RS flip-flop 49 has a set terminal S coupled to the output terminal of comparator 47, a reset terminal R coupled to the output terminal of comparator 48, and an output terminal configured to provide power-OK indicating signal POK. When DC voltage VCC1 is larger than power-OK threshold Vthok, power-OK indicating signal POK becomes high to indicate that DC voltage VCC1 is ready, integrated AC switch circuit 141 starts to provide pulse signal Vsw. and when DC voltage VCC1 decreases less than off threshold Vthoff, power-OK indicating signal POK becomes low to indicate that DC voltage VCC1 is too low, integrated AC switch circuit 141 stops to provide pulse signal Vsw. An AND gate 50 has a first input terminal configured to receive power-OK indicating signal POK, a second input terminal configured to receive enable signal EN, and an output terminal coupled to enable terminal E of RS flip-flop 44. When power-OK indicating signal POK is high and enable signal EN is high, RS flip-flop 44 is enabled; otherwise, when power-OK indicating signal POK is low or enable signal EN is low, RS flip-flop 44 is disabled. In one embodiment, power-OK threshold Vthok is larger than or equals high threshold Vthh, high threshold Vthh is larger than low threshold Vthl, and low threshold Vthl is larger than off threshold Vthoff, for example, power-OK threshold Vthok is 10V, high threshold Vthh is 10V, low threshold Vthl is 7V, and off threshold Vthoff is 5V.

FIG. 5 shows a flowchart 500 for communication between integrated AC switch circuit 141 and MCU 16 according to an embodiment of the present invention. Flowchart 500 comprises steps 51-58. At step 51, integrated AC switch circuit 141 starts up. After that, enable a watchdog timer at step 52, and the watchdog timer starts timing. At step 53, judging if a timing time t of the watchdog timer reaches a watchdog period Twd. If yes, then go to step 56 to turn OFF integrated AC switch circuit 141; if no, then back to step 53 for waiting. And after step 51, integrated AC switch circuit 141 waits for the command from MCU 16 at step 54. At step 55, judging the command type. MCU 16 could send three command, "OFF", "ON", and "Read". If integrated AC switch circuit 141 receives the "OFF" command, it is turned OFF at step 56, for example, at least turn OFF switch M1 and switch M2. If integrated AC switch circuit 141 receives the "ON" command, it is turned ON with the DC voltage generation, and reset the watchdog timer at step 57. If integrated AC switch circuit 141 receives the "Read" command, it sends status information back to MCU at step 58.

Figure 6:
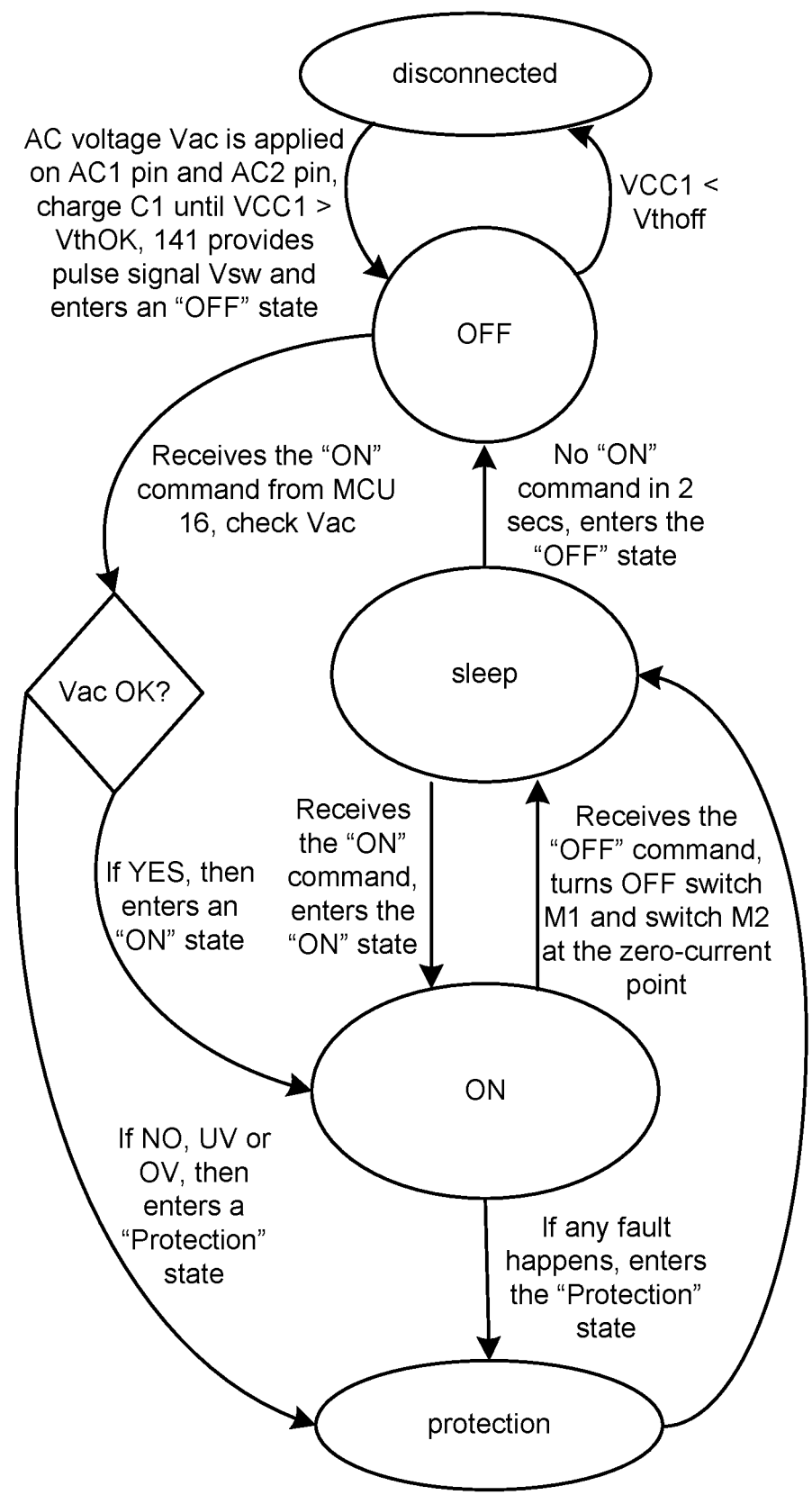
FIG. 6 shows a state diagram illustrating states of integrated AC switch circuit 141 according to an embodiment of the present invention.

FIG. 6 shows a state diagram illustrating states of integrated AC switch circuit 141 according to an embodiment of the present invention. When there is no AC voltage Vac applied on AC1 pin and AC2 pin of integrated AC switch circuit 141, integrated AC switch circuit 141 is in a "disconnected" state. In the "disconnected" state, there is no DC voltage VCC1 provided, switch M1, switch M2, power generation circuit 200, isolated communication circuit 201, protection circuit 202, control circuit 203, driving circuit 204, sensing circuit 205, and oscillation circuit 206 are all OFF.

During the "disconnected" state, when AC voltage Vac is applied on AC1 pin and AC2 pin, integrated AC switch circuit 141 is configured to charge capacitor C1 until DC voltage VCC1 is larger than power-OK threshold Vthok, then integrated AC switch circuit 141 provides pulse signal Vsw, and enters an "OFF" state. In the "OFF" state, switch M1, switch M2, driving circuit 204 are OFF, and isolated communication circuit 201, protection circuit 202, control circuit 203, and sensing circuit 205 are ON.

During the "OFF" state, if DC voltage VCC1 is less than OFF threshold Vthoff, then integrated AC switch circuit 141 enters the "disconnected" state. When receives the "ON" command from MCU 16, integrated AC switch circuit 141 is configured to check AC voltage Vac. If AC voltage Vac is in an accepted range, then integrated AC switch circuit 141 enters an "ON" state. Otherwise, if AC voltage Vac is out of the accepted range, e.g., AC voltage is under voltage (UV) or over voltage (OV), switch M1 and switch M2 maintain OFF and are not respond to the "ON" command, integrated AC switch circuit 141 enters a "protection" state to inform MCU 16 that a fault happened, for example pulls FLT Pin low, and then enters a "sleep" state. In one embodiment, if AC voltage Vac is below an UV threshold, then AC voltage Vac will be judged as UV, and if AC voltage Vac is above an OV threshold, then AC voltage Vac will be judged as OV.

During the "ON" state, when DC voltage VCC1 is less than low threshold Vthl, switch M1 and switch M2 are turned OFF, and capacitor C1 is charged up by integrated AC switch circuit 141; when DC voltage VCC1 is larger than high threshold Vthh, switch M1 and switch M2 are turned ON to connect load 11 to AC voltage Vac, integrated AC switch circuit 141 stops charging capacitor C1. If any fault happens, integrated AC switch circuit 141 enters the "protection" state from the "ON" state to inform that the fault happened, and then enters the "sleep" state. When receives the "OFF" command, integrated AC switch circuit 141 turns OFF switch M1 and switch M2 at the zero-current point, and then enters the "sleep" state.

During the "protection" state, switch M1 and switch M2 are turned OFF, and FLT pin pulls low to inform MCU 16 that the fault happened, and then integrated AC switch circuit 141 enters the "sleep" state.

During the "sleep" state, switch M1 and switch M2 maintain OFF, while other circuits work normally. And if receives the "ON" command within a predetermined time period, e.g., 2 seconds, integrated AC switch circuit 141 enters the "ON" state immediately to turn ON switch M1 and switch M2 without checking AC voltage Vac. If integrated AC switch circuit 141 does not receive the "ON" command in the predetermined time period, then enters the "OFF" state.

Figure 7:
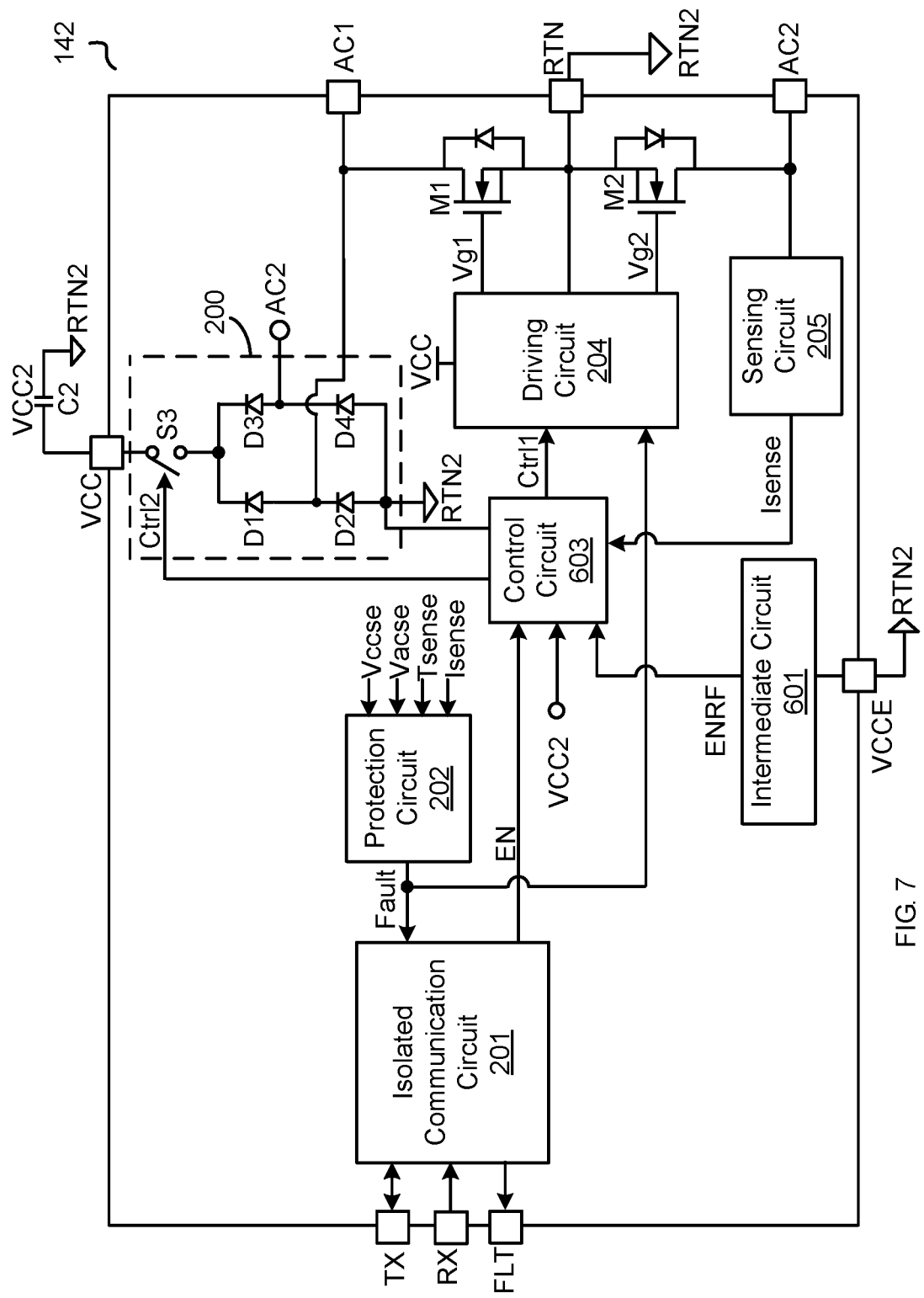
FIG. 7 schematically illustrates an integrated AC switch circuit 142 according to an embodiment of the present invention.

FIG. 7 schematically illustrates an integrated AC switch circuit 142 according to an embodiment of the present invention. Similar to integrated AC switch circuit 141, integrated AC switch circuit 142 comprises switch M1, switch M2, power generation circuit 200, isolated communication circuit 201, protection circuit 202, driving circuit 204, and sensing circuit 205. For simplicity and clarity, circuits same with integrated AC switch circuit 141 are not detailed described hereinafter. Integrated AC switch circuit 142 further comprises an intermediate circuit 601, coupled to VCCE pin and configured to provide a refresh enable signal ENRF based on status of VCCE pin. Power generation circuit 200 in integrated AC switch circuit 142 has two input terminals and two output terminals, wherein the two input terminals are coupled to AC1 pin and AC2 pin of integrated AC switch circuit 142 respectively and the two output terminals are coupled to VCC pin and RTN pin of integrated AC switch circuit 142 respectively. In one embodiment, when VCCE pin is coupled to RTN pin of integrated AC switch circuit 142, refresh enable signal ENRF is low to disable the DC voltage generation, power generation circuit 200 in integrated AC switch circuit 142 maintains OFF, and capacitor C2 is charged by pulse signal Vsw provided by integrated AC switch circuit 141 through isolated cap link 15; and when VCCE pin is floating or pulls high, refresh enable signal ENRF is high to enable the DC voltage generation, power generation circuit 200 in integrated AC switch circuit 142 is configured to charge capacitor C2 via rectifying AC voltage Vac in response to DC voltage VCC2, high threshold Vthh and low threshold Vthl.

Control circuit 603 is configured to provide switching control signal Ctrl1 to control switch M1 and switch M2 and provide switching control signal Ctrl2 to control switch S3 in integrated AC switch circuit 142 based on enable signal EN, DC voltage VCC2, current sense signal Isense, and refresh enable signal ENRF. In one embodiment, when VCCE pin is coupled to RTN pin of integrated AC switch circuit 142, switch S3 maintains OFF, switches M1 and M2 are controlled by switching control signal Ctrl2 based on refresh enable signal EN and current sense signal Isense, e.g., switches M1 and M2 maintain ON in response to the "ON" command from MCU 16, and switches M1 and M2 are turned OFF at the zero-current point in response to the "OFF" command from MCU 16. In another embodiment, when VCCE pin is floating or pulls high, switch S3 is turned ON in response to the a comparing result between DC voltage VCC2 and low threshold Vthl, and switch S3 is turned OFF in response to a comparing result between DC voltage VCC2 and high threshold Vthh. switches M1 and M2 are turned ON in response to the "ON" command from MCU 16. Switches M1 and M2 are turned OFF in response to the comparing result between DC voltage VCC2 and low threshold Vthl, and switches M1 and M2 resume ON in response to the comparison result between DC voltage VCC2 and high threshold Vthh.

Figure 8:
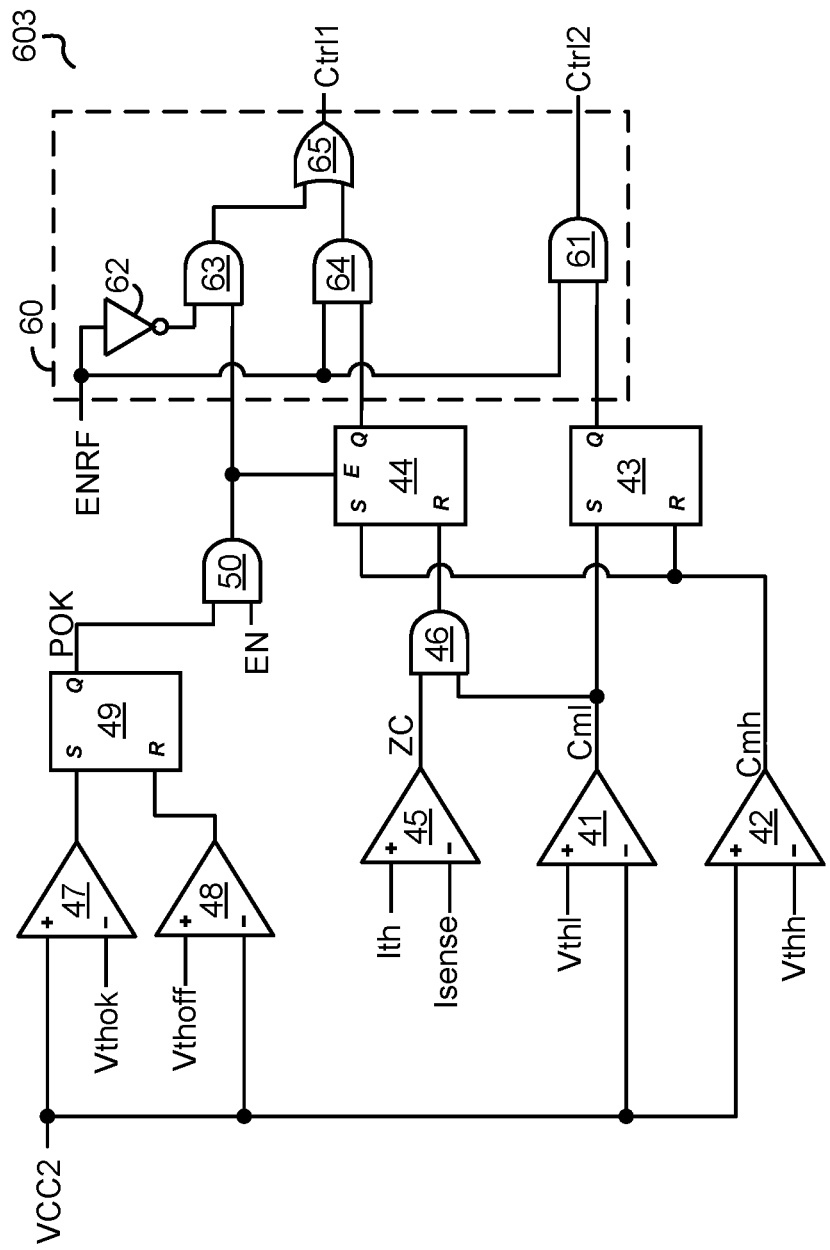
FIG. 8 schematically illustrates a control circuit 603 according to an embodiment of the present invention.

FIG. 8 schematically illustrates a control circuit 603 according to an embodiment of the present invention. In the embodiment shown in FIG. 8, control circuit 603 comprises comparators 41, 42, 45, 47, 48, RS flip-flops 43, 44, 49, and AND gates 46, 50 which have been described above. Comparators 41, 42, 47 and 48 compares DC voltage VCC2 with low threshold Vthl, high threshold Vthh, power-OK threshold Vthok, and OFF threshold Vthoff respectively. Control circuit 603 further comprises a logic circuit 60 comprising an AND gate 61, an inverter 62, an AND gate 63, an AND gate 64, and an OR gate 65. A first input terminal of AND gate 61 receives refresh enable signal ENRF, a second input terminal of AND gate 61 is coupled to output terminal Q of RS flip-flop 43, and an output terminal of AND gate 61 is configured to provide switching control signal Ctrl2. Inverter 62 receives refresh enable signal ENRF and provides a signal at its output terminal by inverting refresh enable signal ENRF. AND gate 63 has a first input terminal coupled to the output terminal of inverter 62, a second input terminal coupled to the output terminal of AND gate 50, and an output terminal. AND gate 64 has a first input terminal configured to receive refresh enable signal ENRF, a second input terminal coupled to output terminal Q of RS flip-flop 44, and an output terminal. OR gate 65 has a first input terminal coupled to the output terminal of AND gate 63, a second input terminal coupled to the output terminal of AND gate 64, and an output terminal configured to provide switching control signal Ctrl1.

Figure 9:
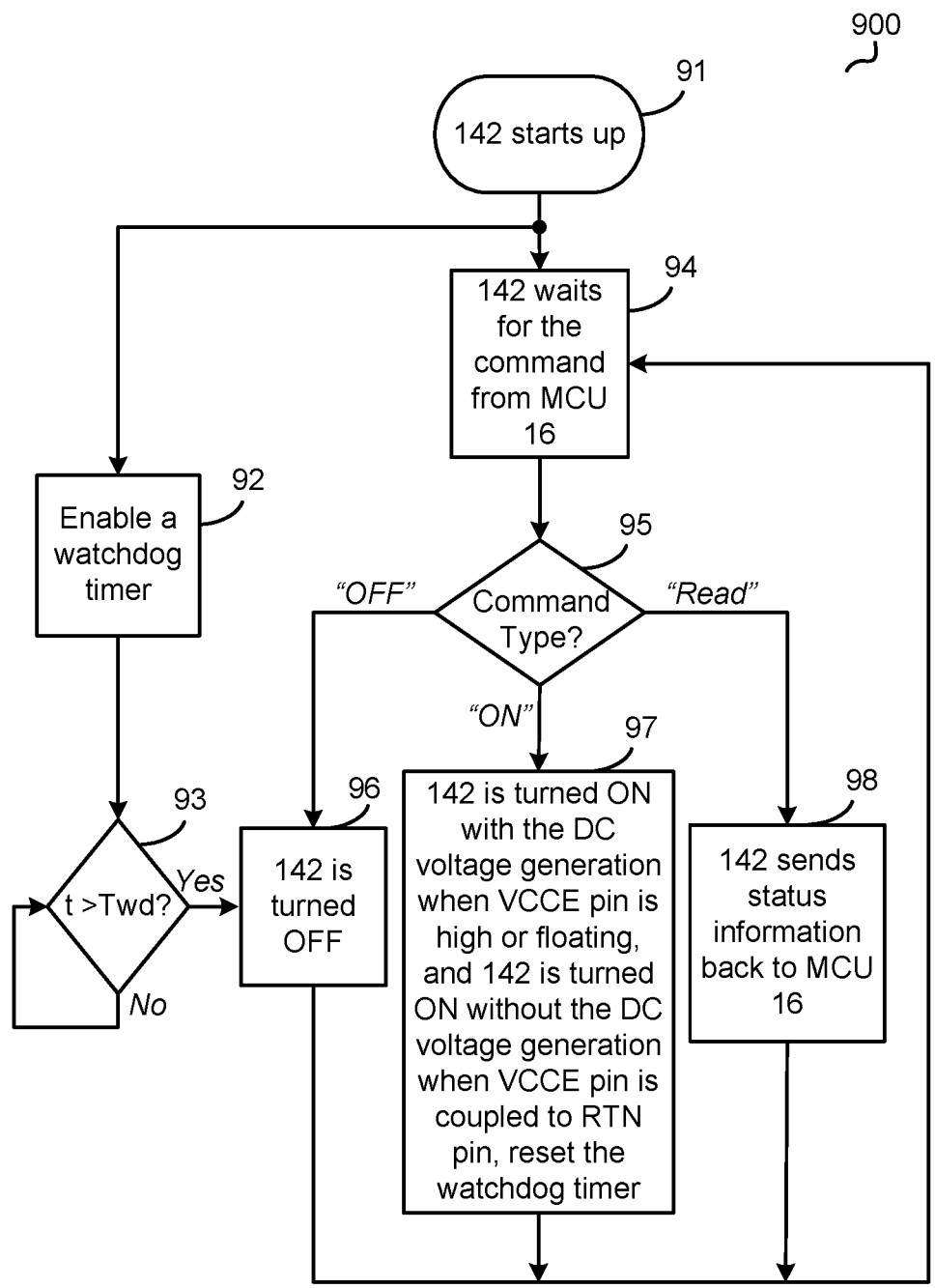
FIG. 9 shows a flowchart 900 for communication between integrated AC switch circuit 142 and MCU 16 according to an embodiment of the present invention.

FIG. 9 shows a flowchart 900 for communication between integrated AC switch circuit 142 and MCU 16 according to an embodiment of the present invention. Flowchart 900 comprises steps 91-98. At step 91, integrated AC switch circuit 142 starts up. After that, enable a watchdog timer at step 92, and the watchdog timer starts timing. At step 93, judging if timing time t of the watchdog timer reaches watchdog period Twd. If yes, then go to step 96 to turn OFF integrated AC switch circuit 142; if no, then back to step 93 for waiting. And after step 91, integrated AC switch circuit 142 waits for the command from MCU 16 at step 94. At step 95, judging the command type. MCU 16 could send three command, "OFF", "ON", and "Read". If integrated AC switch circuit 142 receives the "OFF" command, it is turned OFF at step 96, for example, at least turn OFF switch M1 and switch M2. If integrated AC switch circuit 142 receives the "ON" command, it is turned ON with the DC voltage generation when VCCE pin of integrated AC switch circuit 142 is high or floating; or it is turned ON without the DC voltage generation when VCCE pin of integrated AC switch circuit 142 is coupled to RTN pin. And reset the watchdog timer at step 97. If integrated AC switch circuit 142 receives the "Read" command, it sends status information back to MCU at step 98.

Figure 10:
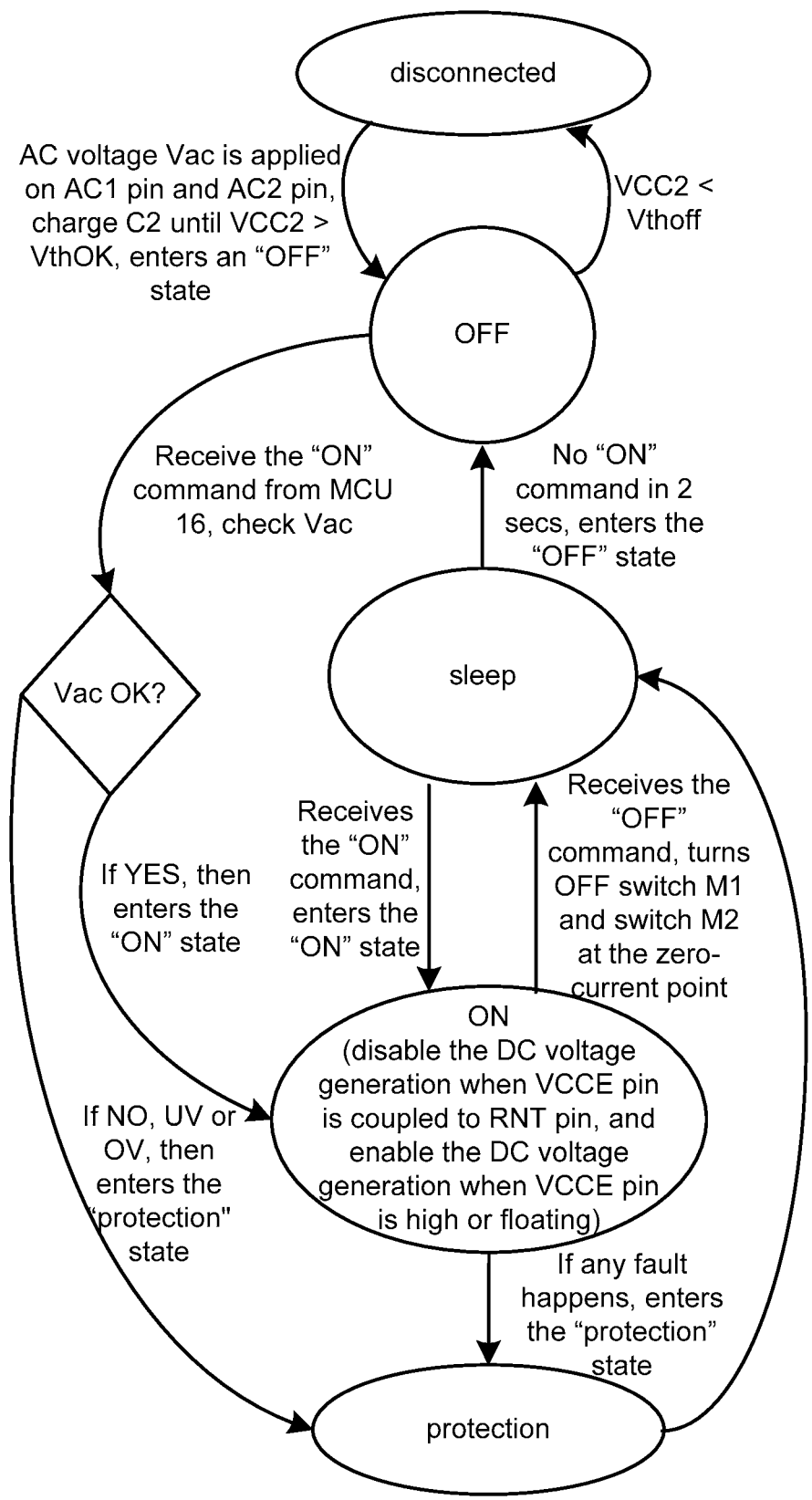
FIG. 10 shows a state diagram illustrating states of integrated AC switch circuit 142 according to an embodiment of the present invention.

FIG. 10 shows a state diagram illustrating states of integrated AC switch circuit 142 according to an embodiment of the present invention. Integrated AC switch circuit 142 has similar state diagram with integrated AC switch circuit 141 shown above, and only differences are detailed described hereinafter. First, during the "disconnected" state, when AC voltage Vac is applied on AC1 pin and AC2 pin, integrated AC switch circuit 142 is configured to charge capacitor C2 until DC voltage VCC2 is larger than power-OK threshold Vthok, and then integrated AC switch circuit 142 enters the "OFF" state. Second, during the "ON" state, if the VCCE pin is coupled to RTN pin of integrated AC switch circuit 142, switch M1 and switch M2 in integrated AC switch circuit 142 maintain ON to connect load 12 to AC voltage Vac, the DC voltage generation is disabled, and power generation circuit 200 in integrated AC switch circuit 142 maintains OFF to disconnect with capacitor C2; and if VCCE pin is floating or pulls high, the DC voltage generation is enabled, when DC voltage VCC2 is less than low threshold Vthl, switch M1 and switch M2 in integrated AC switch circuit 142 are turned OFF and capacitor C2 is charged up by power generation circuit 200 in integrated AC switch circuit 142, and when DC voltage VCC2 is larger than high threshold Vthh, switch M1 and switch M2 in integrated AC switch circuit 142 are turned ON to connect load 12 to AC voltage Vac, power generation circuit 200 in integrated AC switch circuit 142 stops charging capacitor C2.

Figure 11:
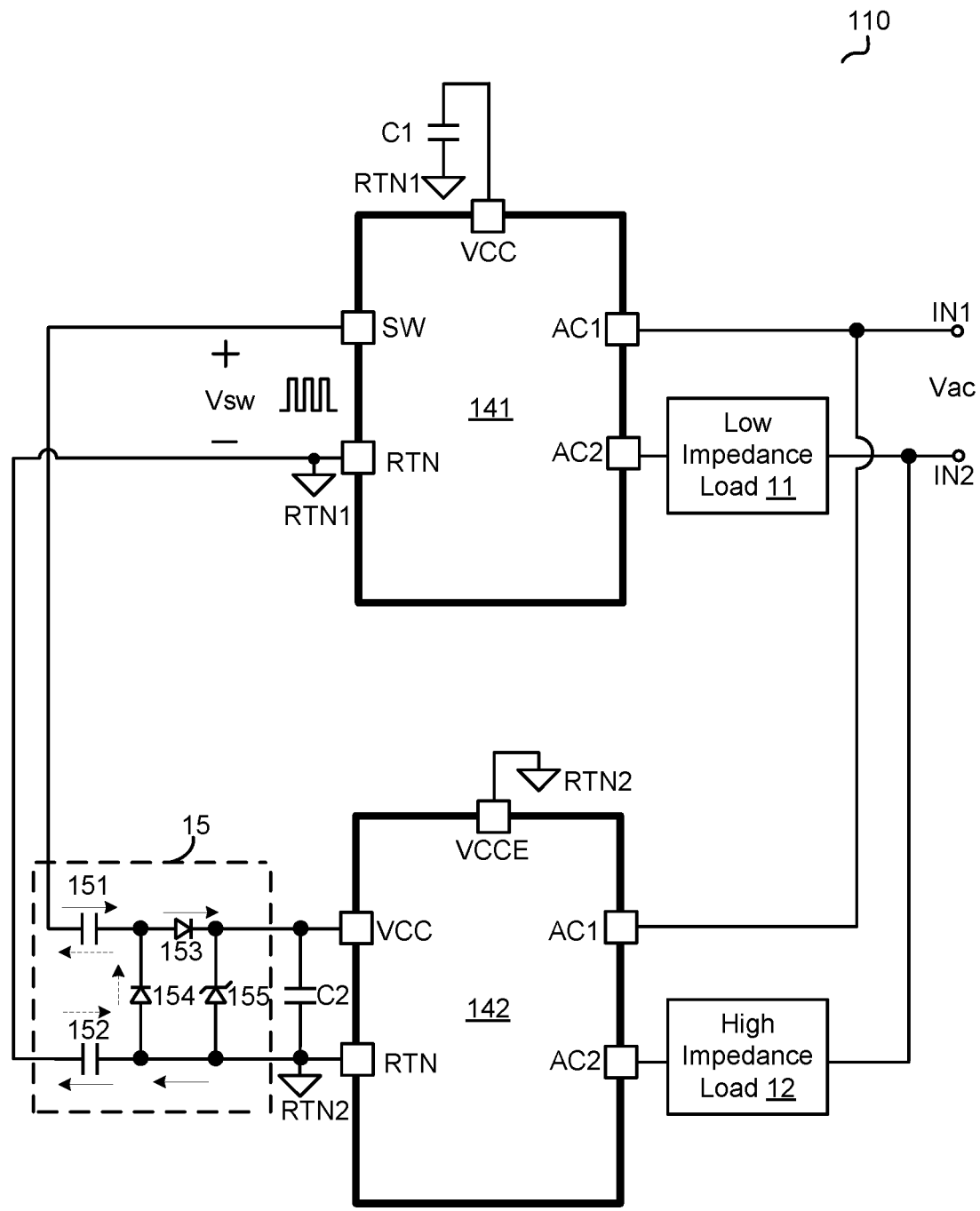
FIG. 11 schematically illustrates an electrical circuit 110 according to an embodiment of the present invention.

FIG. 11 schematically illustrates an electrical circuit 110 according to an embodiment of the present invention. Electrical circuit 110 comprises integrated AC switch circuit 141 connecting low impedance load 11 to AC voltage Vac when integrated AC switch circuit 141 is ON and integrated AC switch circuit 142 connecting high impedance load 12 to AC voltage Vac when integrated AC switch circuit 142 is ON. Integrated AC switch circuit 141 is configured to provide pulse signal Vsw to charge capacitor C2 coupled between VCC pin and RTN pin of integrated AC switch circuit 142. Isolated cap link 15 is coupled between SW pin of integrated AC switch circuit 141 and VCC pin of integrated AC switch circuit 142, and isolated cap link 15 is configured to isolate integrated AC switch circuit 142 from integrated AC switch circuit 141.

More particularly, as shown in FIG. 11, isolated cap link 15 comprises a capacitor 151, a capacitor 152, a diode 153, and a diode 154. One terminal of capacitor 151 is coupled to SW pin of integrated AC switch circuit 141, the other terminal of capacitor 151 is coupled to an anode of diode 153, a cathode of diode 153 is coupled to VCC pin of integrated AC switch circuit 142. One terminal of capacitor 152 is coupled to RTN pin of integrated AC switch circuit 141, the other terminal of capacitor 152 is coupled to an anode of diode 154 and RTN pin of integrated AC switch circuit 142, a cathode of diode 154 is coupled to the anode of diode 153. When pulse signal Vsw is high, capacitor C2 is charged up, a current flow is from SW pin of integrated AC switch circuit 141 to VCC pin of integrated AC switch circuit 142 through capacitor 151 and diode 153, and the current flow returns to RTN pin of integrated AC switch circuit 141 from RTN pin of integrated AC switch circuit 142 through capacitor 152 (solid line). When pulse signal Vsw is low, capacitor C2 stops being charged, the current flow is from RTN pin of integrated AC switch circuit 141 to SW pin of integrated AC switch circuit 141 through capacitor 152, diode 154 and capacitor 151 (dotted line). In one embodiment, a zener diode 155 is further employed to limit DC voltage VCC2 across capacitor C2. An anode of zener diode 155 is coupled to RTN pin of integrated AC switch circuit 142, and a cathode of zener diode 155 is coupled to VCC pin of integrated AC switch circuit 142.

Figure 12:
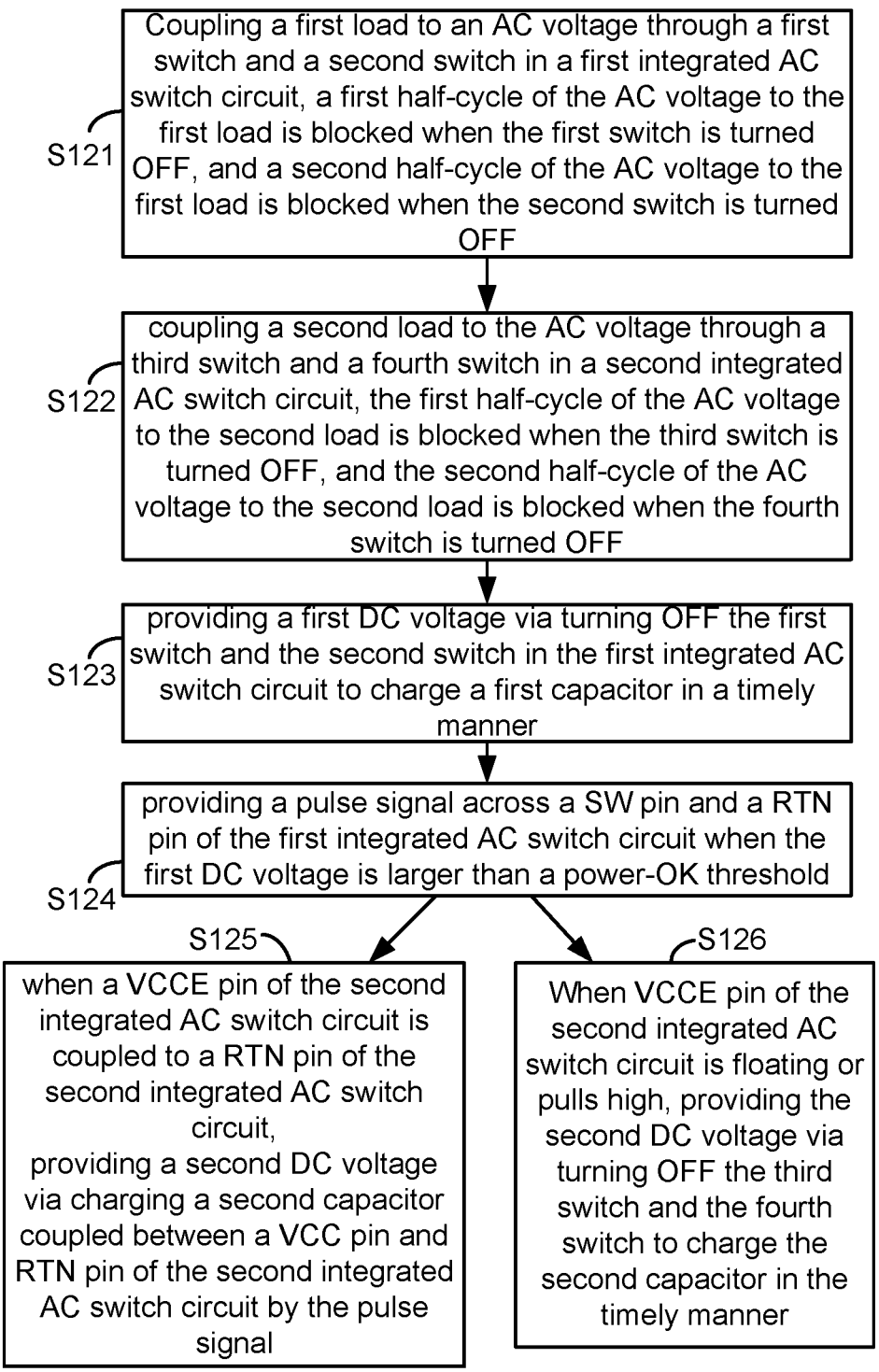
FIG. 12 shows a flow chart illustrating a method for an electrical circuit comprising two integrated AC switch circuits according to an embodiment of the present invention.

FIG. 12 shows a flow chart illustrating a method for an electrical circuit comprising two integrated AC switch circuits according to an embodiment of the present invention. The control method comprises steps S121-S126.

At step S121, coupling a first load to an AC voltage through a first switch and a second switch in a first integrated AC switch circuit, a first half-cycle of the AC voltage to the first load is blocked when the first switch is turned OFF, and a second half-cycle of the AC voltage to the first load is blocked when the second switch is turned OFF.

At step S122, coupling a second load to the AC voltage through a third switch and a fourth switch in a second integrated AC switch circuit, the first half-cycle of the AC voltage to the second load is blocked when the third switch is turned OFF, and the second half-cycle of the AC voltage to the second load is blocked when the fourth switch is turned OFF.

At step S123, providing a first DC voltage via turning OFF the first switch and the second switch in the first integrated AC switch circuit to charge a first capacitor in the timely manner.

At step S124, providing a pulse signal across a SW pin and a RTN pin of the first integrated AC switch circuit when the first DC voltage is larger than a power-OK threshold.

At step S125, when a VCCE pin of the second integrated AC switch circuit is coupled to a RTN pin of the second integrated AC switch circuit, providing a second DC voltage via charging a second capacitor coupled between a VCC pin and RTN pin of the second integrated AC switch circuit by the pulse signal.

At step S126, when VCCE pin of the second integrated AC switch circuit is floating or pulls high, providing the second DC voltage via turning OFF the third switch and the fourth switch to charge the second capacitor in the timely manner.

In one embodiment, the method further comprising: coupling a third capacitor between SW pin of the first integrated AC switch circuit and VCC pin of the second integrated AC switch circuit; and coupling a fourth capacitor between RTN pin of the first integrated AC switch circuit and RTN pin of the second integrated AC switch circuit; coupling a first diode between the third capacitor and VCC pin of the second integrated AC switch circuit, wherein an anode of the first diode is coupled to the third capacitor and a cathode of the first diode is coupled to VCC pin of the second integrated AC switch circuit; and coupling a second diode between the fourth capacitor and the fourth capacitor, wherein an anode of the second diode is coupled to the fourth capacitor and RTN pin of the second integrated AC switch circuit, and a cathode of the second diode is coupled to the third capacitor and the anode of the first diode.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. An electrical circuit, comprising:
a first integrated AC switch circuit, connecting a first load to an AC voltage when the first integrated AC switch circuit is ON, comprising a VCC pin coupled to a first capacitor to provide a first DC voltage, a SW pin configured to provide a pulse signal associated with the first DC voltage, a first switch coupled to block a first half-cycle of the AC voltage to the first load when the first switch is OFF, a second switch coupled to block a second half-cycle of the AC voltage to the first load when the second switch is OFF, and a first power generation circuit configured to charge the first capacitor via rectifying the AC voltage; and
a second integrated AC switch circuit, connecting a second load to the AC voltage when the second integrated AC switch circuit is ON, comprising a VCC pin coupled to a second capacitor to provide a second DC voltage, a VCCE pin selectively coupled to a first reference ground, a third switch coupled to block the first half-cycle of the AC voltage when the third switch is OFF, and a fourth switch coupled to the third switch to block the second half-cycle of the AC voltage when the fourth switch is OFF; wherein
when the VCCE pin is coupled to the first reference ground, the pulse signal provided by the first integrated AC switch circuit is configured to charge the second capacitor.

2. The electrical circuit of claim 1, further comprising an isolated cap link coupled between the SW pin of the first integrated AC switch circuit and the VCC pin of the second integrated AC switch circuit, and the isolated cap link is configured to isolate the second integrated AC switch circuit from the first integrated AC switch circuit.

3. The electrical circuit of claim 2, wherein the first integrated AC switch circuit further comprises a RTN pin coupled to a second reference ground, the second integrated AC switch circuit further comprises a RTN pin coupled to the first reference ground, and wherein the isolated cap link further comprises:
a third capacitor, having a first terminal coupled to the SW pin of the first integrated AC switch circuit, and a second terminal;
a first diode, having an anode coupled to the second terminal of the third capacitor, and a cathode coupled to the VCC pin of the second integrated AC switch circuit;
a fourth capacitor, having a first terminal coupled to the RTN pin of the first integrated AC switch circuit, and a second terminal coupled to the RTN pin of the second integrated AC switch circuit; and
a second diode, having an anode coupled to the second terminal of the fourth capacitor, and a cathode coupled to the second terminal of the third capacitor and the anode of the first diode.

4. The electrical circuit of claim 1, wherein the second integrated AC switch circuit further comprises:
a second power generation circuit, configured to charge the second capacitor in a timely manner via rectifying the AC voltage in response to the second DC voltage when the VCCE pin is floating or pulls high; and
wherein
when the VCCE pin pulls low, the second power generation circuit maintains OFF.

5. The electrical circuit of claim 1, wherein when the first DC voltage is larger than a power-OK threshold, the first integrated AC switch circuit starts to provide the pulse signal.

6. The electrical circuit of claim 1, wherein the first integrated AC switch circuit further comprises:
- a first comparator, configured to compare the first DC voltage with a power-OK threshold;
- a second comparator, configured to compare the first DC voltage with an off threshold, wherein the power-OK threshold is larger than the off threshold; and
- an oscillation circuit, configured to provide the pulse signal when the first DC voltage is larger than the power-OK threshold, and stops to provide the pulse signal when the first DC voltage is less than the off threshold.

7. The electrical circuit of claim 1, wherein:
- when there is no AC voltage applied, the first integrated AC switch circuit is in a "disconnected" state;
- during the "disconnected" state, when the AC voltage is applied, the first capacitor is charged until the first DC voltage is larger than a power-OK threshold, then the first integrated AC switch circuit is configured to provide the pulse signal and enters an "OFF" state, the first switch and the second switch are turned OFF;
- during the "OFF" state, when receives an "ON" command, the first integrated AC switch circuit is configured to check the AC voltage, if the AC voltage is in an accepted range, then the first integrated AC switch circuit enters an "ON" state, otherwise if the AC voltage is out of the accepted range, the first switch and the second switch maintain OFF, the first integrated AC switch circuit enters a "protection" state to inform that a fault happened, and then enters a "sleep" state;
- during the "ON" state, when the first DC voltage is less than a low threshold, the first switch and the second switch are turned OFF and the first capacitor is charged up by the first integrated AC switch circuit, and when the first DC voltage is larger than a high threshold, the first switch and the second switch are turned ON to connect the first load to the AC voltage, the first integrated AC switch circuit stops charging the first capacitor, wherein the high threshold is larger than the low threshold, and if any fault happens, the first integrated AC switch circuit enters the "protection" state from the "ON" state to inform that the fault happened, and then enters the "sleep" state; and
- during the "sleep" state, if does not receive the "ON" command within a predetermined time period, the first integrated AC switch circuit enters the "OFF" state, otherwise if receives the "ON" command within the predetermined time period, the first integrated AC switch circuit enters the "ON" state without checking the AC voltage.

* * * * *